(12) United States Patent
LaPorta et al.

(10) Patent No.: US 7,340,253 B2
(45) Date of Patent: Mar. 4, 2008

(54) IP-BASED DISTRIBUTED WIRELESS ACCESS NETWORK ARCHITECTURE FOR CDMA NETWORKS

(75) Inventors: Thomas F. LaPorta, Holmdel, NJ (US); Ramachandran Ramjee, Edison, NJ (US); Krishan K. Sabnani, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 998 days.

(21) Appl. No.: 10/166,403

(22) Filed: Jun. 10, 2002

(65) Prior Publication Data

US 2003/0228878 A1    Dec. 11, 2003

(51) Int. Cl.
*H04Q 7/20*    (2006.01)
(52) U.S. Cl. ............... 455/438; 455/134; 455/436; 370/320; 370/331
(58) Field of Classification Search .......... 455/69, 455/522, 436, 439, 442, 422.1, 423, 115.3, 455/438, 443, 444, 161.3, 134; 370/320, 370/331
See application file for complete search history.

(56) References Cited

U.S. PATENT DOCUMENTS

| | | | |
|---|---|---|---|
| 5,949,773 A * | 9/1999 | Bhalla et al. ............... 370/331 |
| 6,085,108 A * | 7/2000 | Knutsson et al. ........... 455/522 |
| 6,230,013 B1 * | 5/2001 | Wallentin et al. ........... 455/436 |
| 6,757,270 B1 * | 6/2004 | Kumar et al. ............... 370/342 |
| 7,020,112 B2 * | 3/2006 | Cleveland et al. .......... 370/335 |
| 2003/0142648 A1 * | 7/2003 | Semper ...................... 370/331 |

* cited by examiner

*Primary Examiner*—Tu Nguyen

(57) ABSTRACT

A system that enables end-to-end networking within CDMA oriented networks. Several base stations operating within the CDMA oriented network simultaneously receive data from the same mobile unit. A distributed algorithm operating within each of the base stations monitors the reception of the data from the mobile unit, as well as commands/instructions from other base stations. One of the base stations is appointed as a dominant base station. The appointment of a dominant base station can be done randomly or based on the quality of data being received by the base station. When the dominant base station detects a decrease in the quality of received data from the mobile unit, the dominant base station instructs the remainder of the base stations to forward any data received from the mobile to the dominant base station. If the quality of data received by another base station is greater than the quality of data received by the dominant base station, the dominant base station will inform the alternate base station that it is now the dominate base station. If the dominant base station determines that the quality of data received exceeds a particular threshold, the dominant base station will instruct the other base stations to cease reception of data from the particular mobile unit.

14 Claims, 3 Drawing Sheets

IP-BASED DISTRIBUTED WIRELESS ACCESS NETWORK ARCHITECTURE FOR CDMA NETWORKS

TECHNICAL FIELD

The present invention relates to the field of wireless communications, and more particularly, enabling CDMA-based networks to integrate with wire line networks for packet transportation.

BACKGROUND OF THE INVENTION

In 1983, the sight of someone talking a mile a minute in an otherwise empty automobile would be a little unsettling, the San Diego Padres played baseball in Jack Murphy Stadium, and, if you needed to call home to be reminded of what it was you were supposed to pick up at the grocery store, you had to find a telephone booth. But today, the proliferation of cellular technology has changed this, and many more characteristics of our lives. Today, everyone talks a mile a minute in an otherwise empty car and the grocery store is full of confused men, wandering aimlessly through the isles and being directed through instructions received through a cellular telephone. And the San Diego Padres, well they play in a stadium named after one of the pioneers in cellular technology. The present invention herein disclosed is yet another innovative idea to enhance the growth, reliability and applicability of this technology.

Fourth generation wireless networks will likely be based on packet transport technology. A likely candidate is IP, although other alternatives are possible. These systems will use general networking techniques, allowing them to be fully integrated with wireline networks. Networks based on code-division multiple-access ("CDMA") technology and wideband CDMA ("W-CDMA"), including both second and third generation systems, face special challenges when using packet technology because of the network architectures built to handle the air interface specific processing functions. Thus, there is a need in the art for a method to enable CDMA systems to use general networking techniques, and hence be part of fourth generation wireless networks.

When a mobile device transmits an IP packet, it is fragmented into small frames for transmission over the air. These frames must be re-assembled into full IP packets before being transmitted into the IP backbone network. If this re-assembly function could take place at the base station, end-to-end IP networking could be used in wireless networks, making them fully compatible with wireline networks.

However, in current CDMA networks, this is difficult because the networks require a function called frame selection to be performed in order to support what is called soft-handoffs. During a soft handoff, frames transmitted from a mobile are received by more than one base station. These frames are forwarded to a common piece of equipment in the network called a frame selector. The frame selector picks the frame with the highest probability of being received without error, typically based on a measurement embedded in the frame, and discards the other frames. Only after this function is performed can the reassembly process take place. A dual function is performed in the reverse direction. Therefore, IP networking must end at the point in the network where frame selection takes place. Thus, there is a need in the art for a method to perform re-assembly of the fragmented IP packets at the base station of a CDMA network.

In current CDMA networks, and those planned for third generation systems, this function is performed inside the network at a central point called the Radio Network Controller. There are two reasons for this. First, base stations are connected to the backbone network over low-speed transmission lines. Therefore, it is difficult for them to exchange traffic with each other to perform this function. Second, the measurement information embedded in the frames is used in power control algorithms that are run on processors inside the networks. Thus, there is a need in the art for a frame selection function, and hence packet reassembly function, to be performed at the base station, hence allowing end-to-end IP networking.

SUMMARY OF THE INVENTION

The present invention overcomes the limitations of the existing technology by providing the movement of the frame selection function to the base station. One aspect of the present invention is the use of a distributed algorithm to dictate when soft handoff phases begin and terminate instead of the centralized algorithms that execute today. Another aspect of the present invention is the separation of user traffic from the power control related measurement information embedded in frames to allow power control algorithms to continue to execute on processors inside the network.

More specifically, the present invention includes a system for enabling end-to-end IP networking within code division multiple access (CDMA) cellular networks. In one embodiment of the presenting invention, several base stations operating within the CDMA network may be receiving data from a particular mobile unit at the same time. A distributed algorithm operating within each of the base stations monitors the reception of the data from the mobile unit, as well as commands/instructions from other base stations. One of the base stations is appointed as a dominant base station. The appointment of a dominant base station can be done randomly or based on the quality of data being received by the base station. When the dominant base station detects a decrease in the quality of received data from the mobile unit, the dominant base station instructs the remainder of the base stations to forward any data received from the mobile unit to the dominant base station. If the quality of data received by another base station is greater than the quality of data received by the dominant base station, the dominant base station will inform the alternate base station that it is now the dominate base station. If the dominant base station determines that the quality of data received exceeds a particular threshold, the dominant base station will instruct the other base stations to cease reception of data from the particular mobile unit.

DETAILED DESCRIPTION

Figure 1:
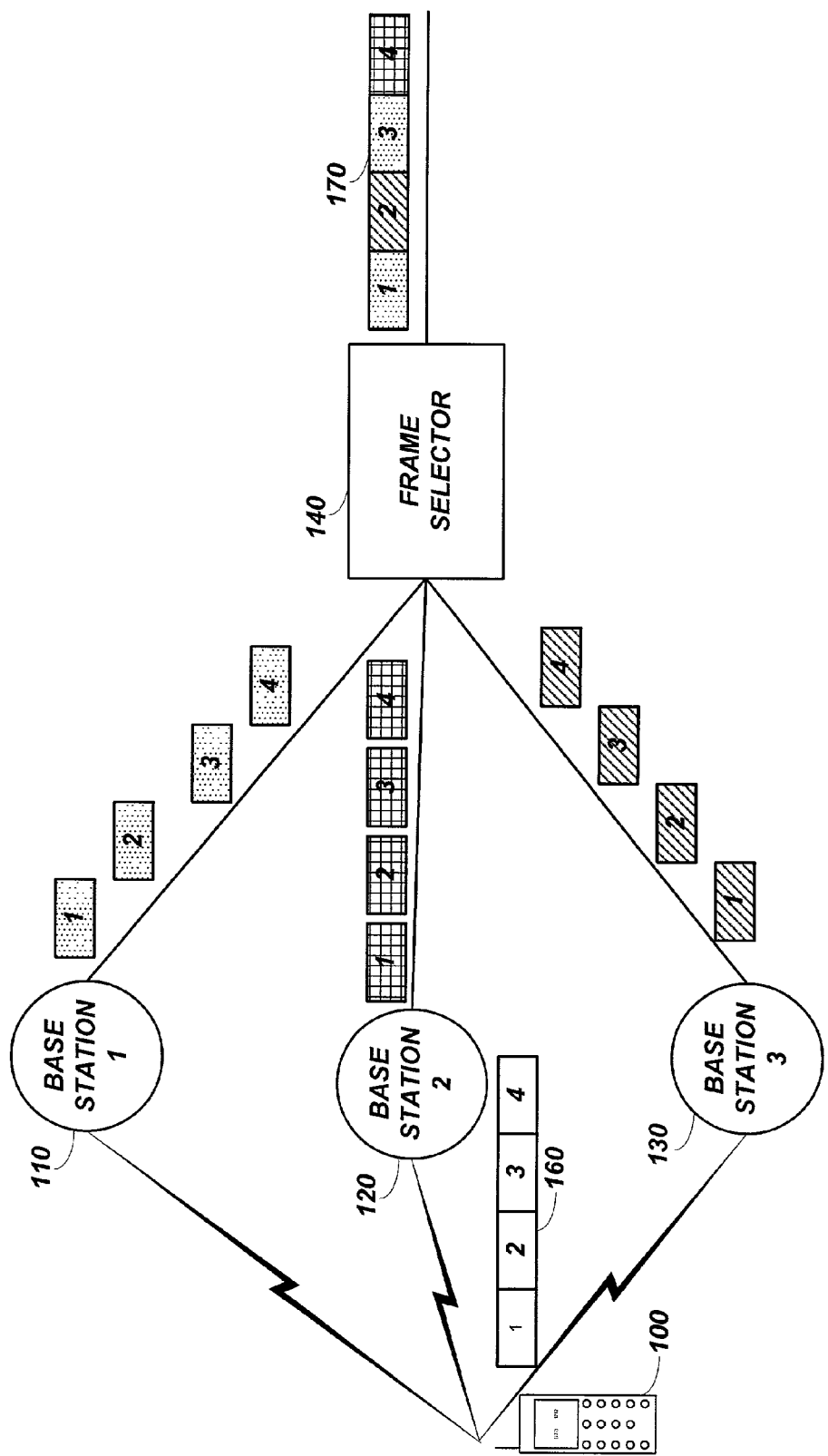
FIG. 1 is a functional network diagram illustrating the operation of current CDMA networks in processing packets.

Referring now to the drawings, in which like numerals refer to like parts or actions throughout the several views, exemplary embodiments of the present invention are described.

As fourth generation networks are deployed, backhaul networks will move from low-speed transmission links to high-speed networks such a Gigabit Ethernet or metro rings. Therefore, base stations will be able to exchange traffic and perform frame selection. The present invention enables the movement of the frame selection function to the base station. More specifically, one aspect of the present invention is the use of a distributed algorithm to dictate when soft handoff phases begin and terminate instead of the centralized algorithms that execute today. Another aspect of the present invention is the separation of user traffic from the power control related measurement information embedded in frames to allow power control algorithms to continue to execute on processors inside the network.

The distributed algorithm aspect of the present invention enables a dynamic assignment of a dominant base station operating within the CDMA network. FIG. 1 is a functional network diagram illustrating the operation of current CDMA networks in processing packets. A mobile transceiver 100 transmits a packet 160 that is received by base station 1 110, base station 2 120 and base station 3 130. The quality of reception of the packet 160 by each of the base stations may vary depending on a variety of factors. The packets are processed on a frame-by-frame basis and the base stations forward the frames to a frame selector 140. The frame selector 140 selects the most reliable frames and re-assembles them into a received packet 170 for forwarding to a destination.

Figure 2:
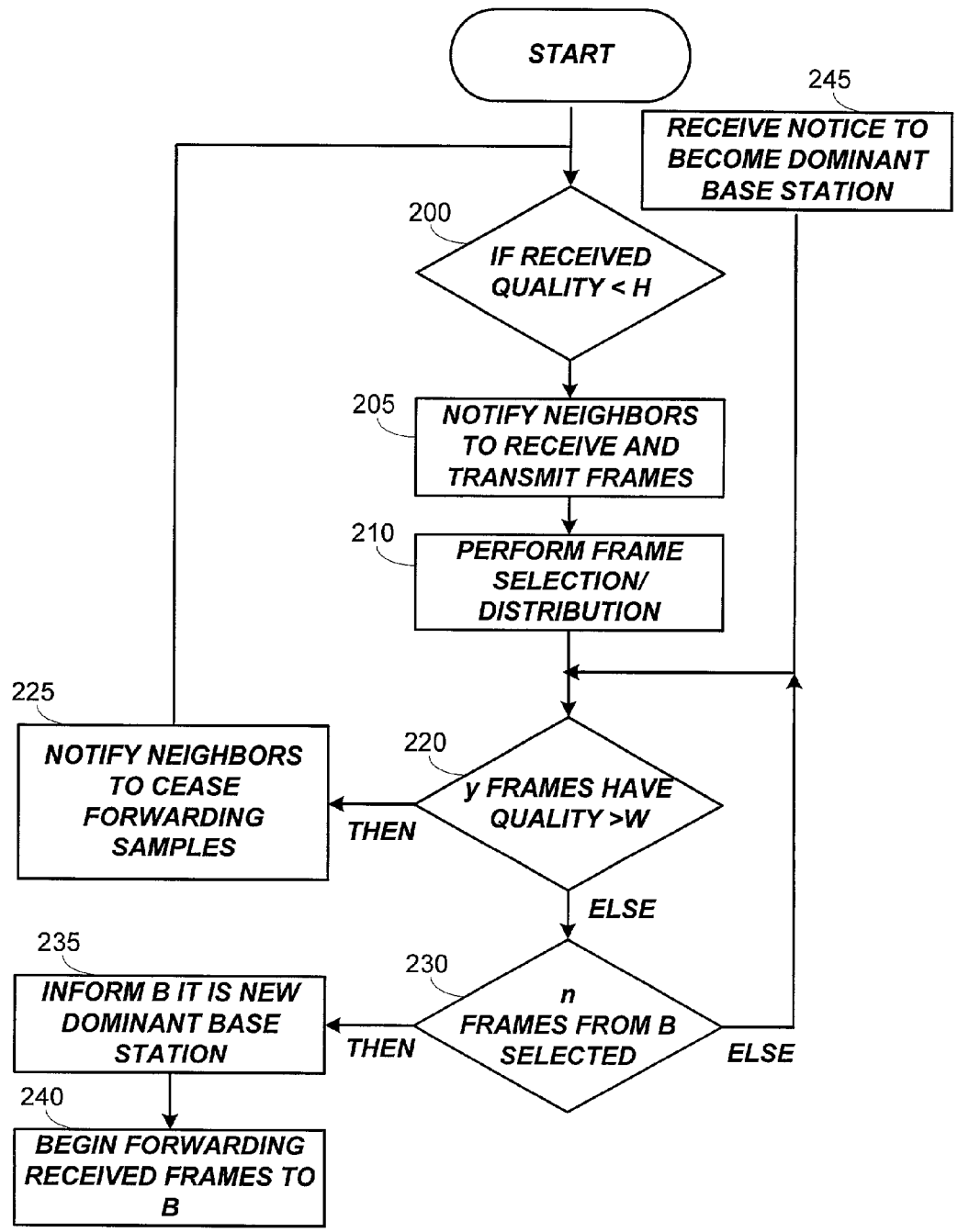
FIG. 2 is a flow diagram illustrating the operation of the distributed algorithm aspect of the present invention.

FIG. 2 is a flow diagram illustrating the operation of the distributed algorithm aspect of the present invention. When a base station receives embedded measurements indicating a quality of below a certain value H (200), it instructs its neighbors to start receiving frames from the mobile unit and forwarding them to itself for the frame selection process (205) and then the base station begins to perform the frame selection/distribution process (210). At this time, the initial base station is called the dominant base station. If the dominant base station receives y consecutive frames from its own radio that are above quality threshold W (220), it instructs the neighboring base stations to cease receiving frames from the mobile (225), and hence exits the software handoff phase. Otherwise, it continues to perform the frame selection function unless a new dominant base station is chosen. If the dominant base station determines that n consecutive frames from any base station B, including itself, are selected as being of the highest quality (230), it informs B that it is now the dominant base station (235) and begins to forward received frames to base station B (240). The base station will continue to operate in this fashion unless it is instructed to stop sending frames or to become the dominant base station (245).

PSEUDO CODE Representation of FIG. 2

---

Start: Dominant Base Station
    If received quality < H
        notify neighbors to receive and transmit frames
        perform frame selection/distribution
FS:
    If y consecutive frames received with quality> W
        notify neighbors to cease forwarding samples
        go to Start
    If n consecutive frames received from base station B are
        selected inform B it is the new dominant base station
        forward received frames to B until instructed to stop
        if instructed to become dominant base station go to FS

---

Figure 3:
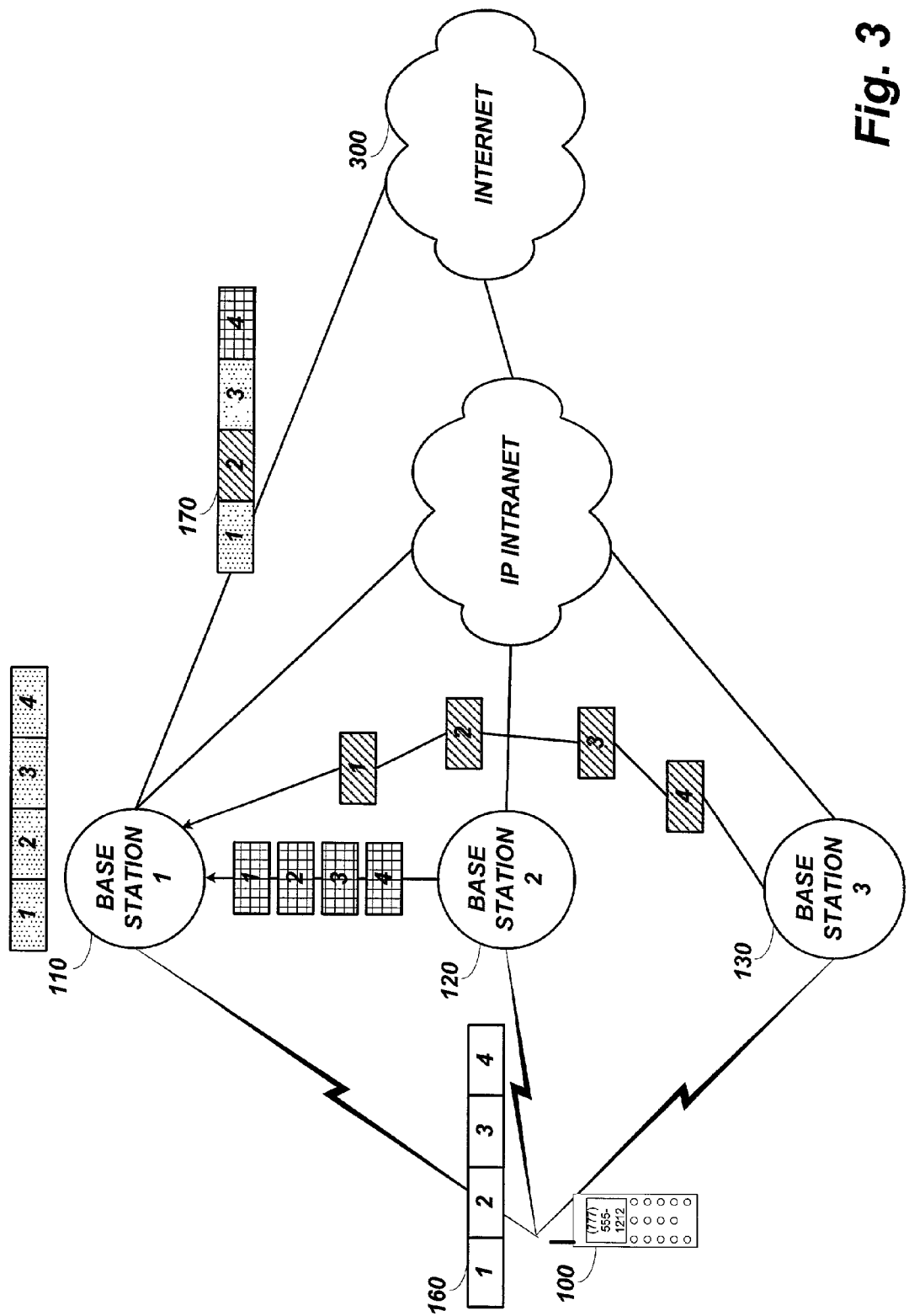
FIG. 3 is a functional network diagram illustrating the operation of the present invention embedded in a CDMA network.

FIG. 3 is a functional network diagram illustrating the operation of the present invention embedded in a CDMA network. Frame selection, and hence packet re-assembly is performed at the base station so that end-to-end IP networking can be used. No central controller is needed to determine the start and end of the soft handoff phase. Control is passed among the base stations using the distributed control algorithm described above. In this embodiment of the present invention, a packet 160 is transmitted from a mobile unit 100 and is received by a base station 1 110, base station 2 120 and base station 3 130. In this example, base station 1 110 is the dominant base station. Thus, base station 2 120 and base station 3 130 forward the frames of the packet 160 to base station 110. Base station 1 110 re-assembles the frames into a packet 170 and forwards the packet to a destination on the Internet 300.

In addition, the radio network controller in current networks performs a function called reverse outer loop power control. In the present invention, this power control functionality is performed either at the dominant base station or in a centralized location. When the dominant base station receives one or more samples of a frame, it removes the embedded measurement information. This information is then forwarded, if necessary, to a central controller that executes power control algorithms. This separation of control information from user transport allows the frame selection function to be performed in the base station while existing power control algorithms may continue to be used.

It should be understood that the present invention has been illustrated with respect to a specific embodiment. The disclosed embodiment focuses on IP networking; however the present invention may be used for other technologies such as ATM or multiprotocol label switching ("MPLS"). MPLS is a networking protocol that provides solutions to problems that plague present-day networks including speed, scalability, quality-of-service (QoS) management, and traffic engineering. MPLS addresses issues related to scalability and routing (based on QoS and service quality metrics) and can exist over existing asynchronous transfer mode (ATM) and frame-relay networks.

While this invention has been described in detail with particular reference to preferred embodiments thereof, it will be understood that variations and modifications can be effected within the scope of the invention as defined in the appended claims.

We claim:

1. A base station that enables end-to-end networking within code division multiple access (CDMA) oriented cellular networks, the base station, when operating in a dominant mode, being operative to:
    in response to detecting a decrease in the quality of received data from a particular mobile unit, instructing neighboring base stations to receive data from the particular mobile and to forward said received data to the dominant base station;
    in response to determining that the quality of said received data is greater at an alternate base station, informing said alternate base station as a dominant base station; and
    in response to determining the quality of data received exceeds a particular threshold, instructing the neighboring base stations to cease reception of data from the particular mobile unit.

2. The base station of claim 1, wherein the base station is operative to commence operating in a dominant mode by:

monitoring the quality of received data; and in response to detecting a quality of received data that exceeds a threshold value, assuming the role of the dominant base station.

3. The base station of claim 1, wherein the base station is operative to commence operating in a dominant mode by receiving a notice from another base station indicating that the base station is the dominant base station.

4. The base station of claim 1, wherein the base station is operative to:
receive notification from a particular base station instructing the base station to transmit any received frames to the particular base station; and
transmitting any received frames to the particular base station.

5. The base station of claim 1, wherein the base station is operative to:
receive notification from a particular base station instructing the base station to cease the reception of data from a particular mobile unit; and
ceasing to receive data from the particular mobile unit.

6. The base station of claim 1, wherein the base station is operative to:
extract power control information from the received data; and
forward the power control information to a central location for performing power control.

7. The base station of claim 1, wherein the base station is operative to:
extract power control information from the received data; and
perform power control operations based on the power control information.

8. A system for enabling end-to-end networking within code division multiple access (CDMA) oriented cellular networks, the system comprising the components of:
a plurality of base stations operable to receive data from a particular mobile unit;
a distributed algorithm operating within each of the plurality of base stations, the distributed algorithm operative to:
identify a dominant base station from among the plurality of base stations;
in response to said dominant base station detecting a decrease in the quality of received data from said particular mobile unit instructing the remainder of the plurality of base stations to receive data from the particular mobile and to forward said received data to the dominant base station;
in response to the dominant base station determining that the quality of said received data is greater at an alternate base station, said dominant base station informing said alternate base station that it is now the dominant base station; and
in response to said dominant base station determining the quality of data received exceeds a particular threshold, instructing the remainder of the plurality of base stations to cease reception of data from the particular mobile unit.

9. The system of claim 8, wherein the base station is operative to:
extract power control information from the received data; and
forward the power control information to a central location for performing power control.

10. The system of claim 8, wherein the base station is operative to:
extract power control information from the received data; and
perform power control operations based on the power control information.

11. A process operating to enable end-to-end networking within a CDMA oriented cellular network comprising the steps of:
in response to the detection of a decrease in the quality of received data from a particular mobile unit, instructing one or more neighboring base stations to receive data from the particular mobile and to forward said received data to a dominant base station;
in response to the determination that the quality of said received data is greater at an alternate base station, informing said alternate base station as a dominant base station;
in response to the determination that the quality of data received exceeds a particular threshold, instructing the neighboring base stations to cease reception of data from the particular mobile unit; and
said dominant base station assembling the data into IP packets to be transmitted to an IP backbone network.

12. The process of claim 11, further comprising the steps of:
identifying the dominant base station from among a plurality of base stations that are receiving data from the mobile unit, each base station monitoring the quality of received data; and
in response to detecting a quality of received data that exceeds a threshold value at a particular base station, that particular base station being identified as the dominant base station.

13. The process of claim 11, wherein the dominant base station is operative to:
extract power control information from the received data; and
forward the power control information to a central location for performing power control.

14. The process of claim 11, wherein the dominant base station is operative to:
extract power control information from the received data; and
perform power control operations based on the power control information.

* * * * *